April 16, 1968     W. J. WALLACE     3,378,130
UNLOADING MACHINE FOR TANKERS OR THE LIKE
Filed Oct. 12, 1966     7 Sheets-Sheet 1

INVENTOR
Walter J. Wallace
by McDougall, Hersh,
Scott and Ladd
Attys

April 16, 1968  W. J. WALLACE  3,378,130
UNLOADING MACHINE FOR TANKERS OR THE LIKE
Filed Oct. 12, 1966  7 Sheets-Sheet 2
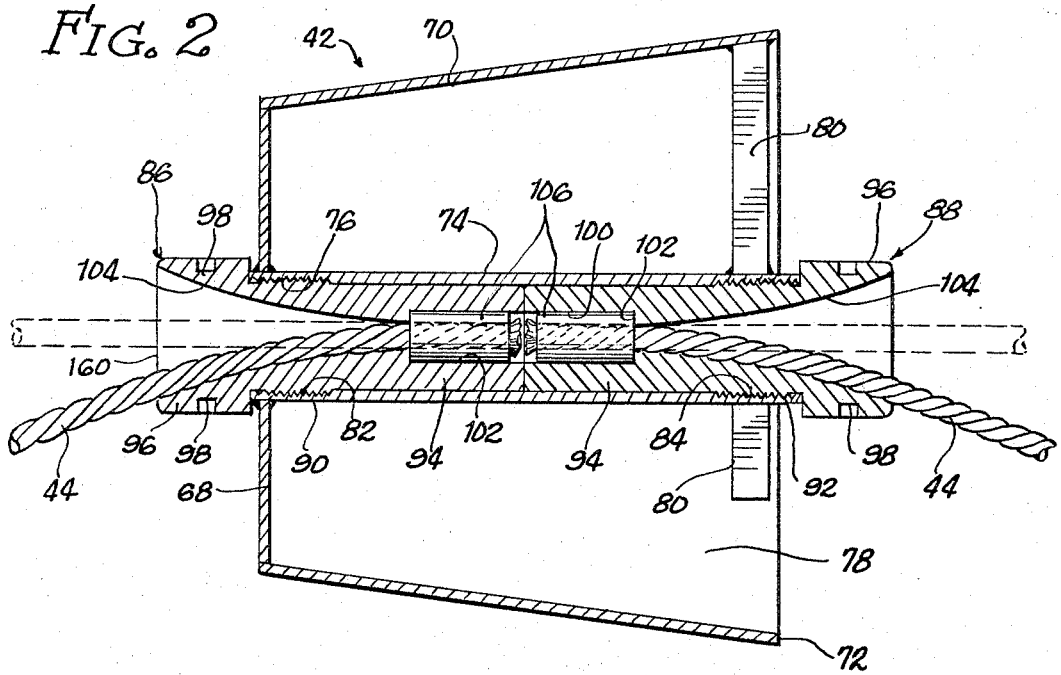
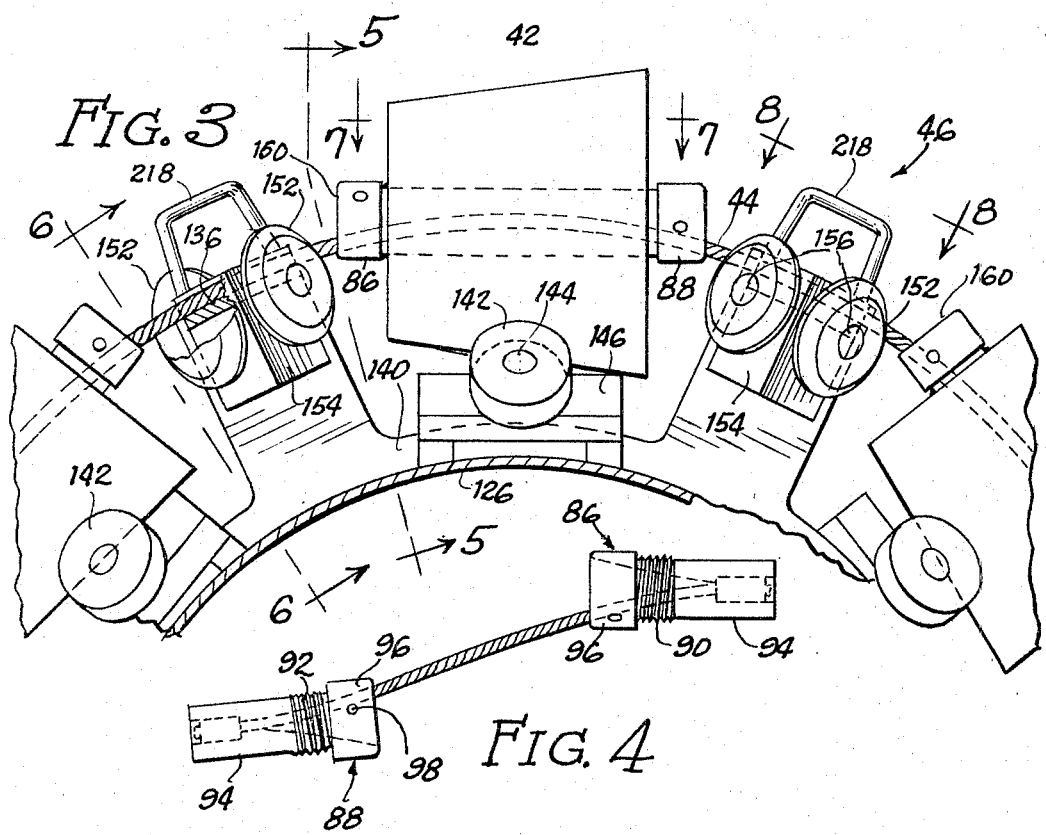

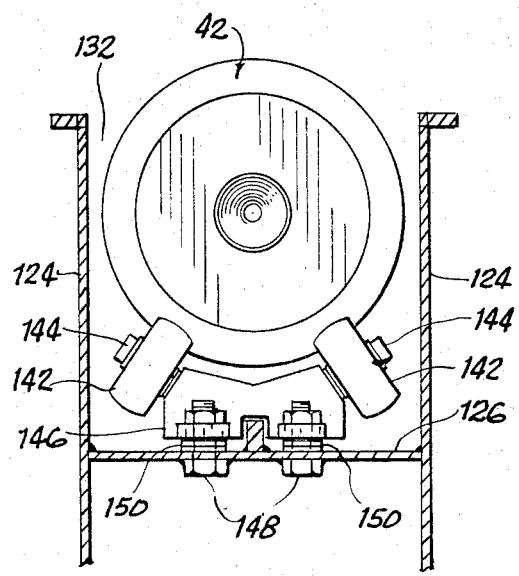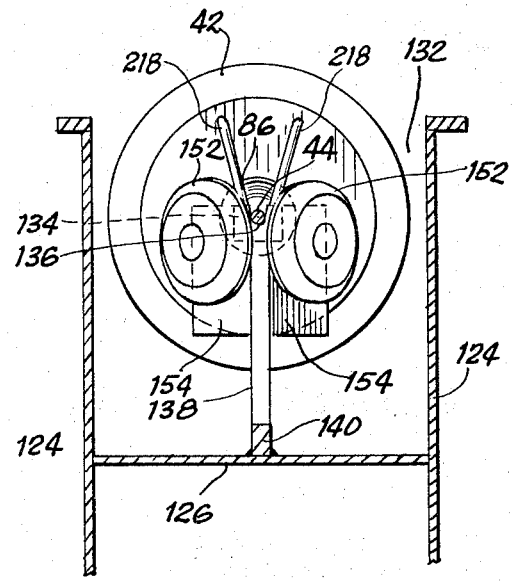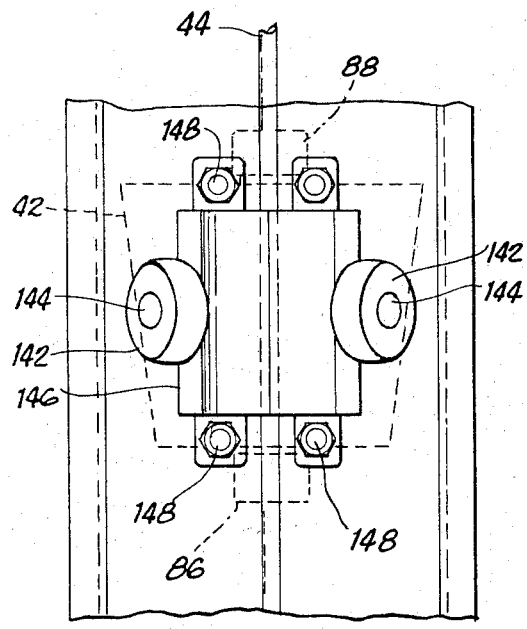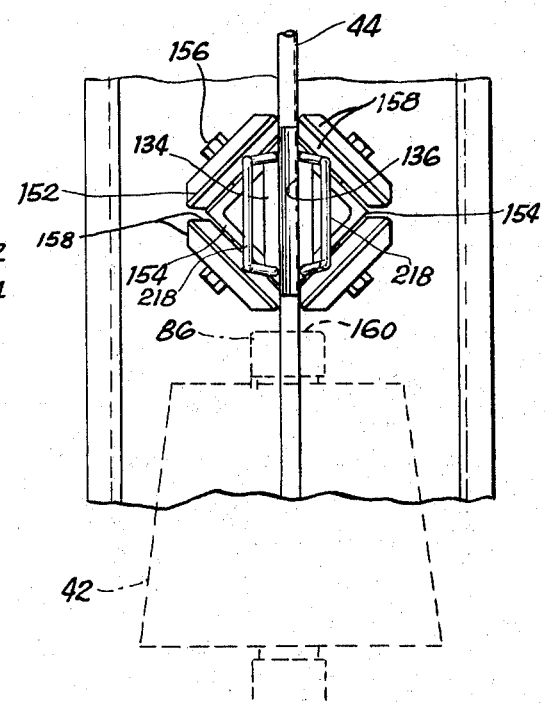

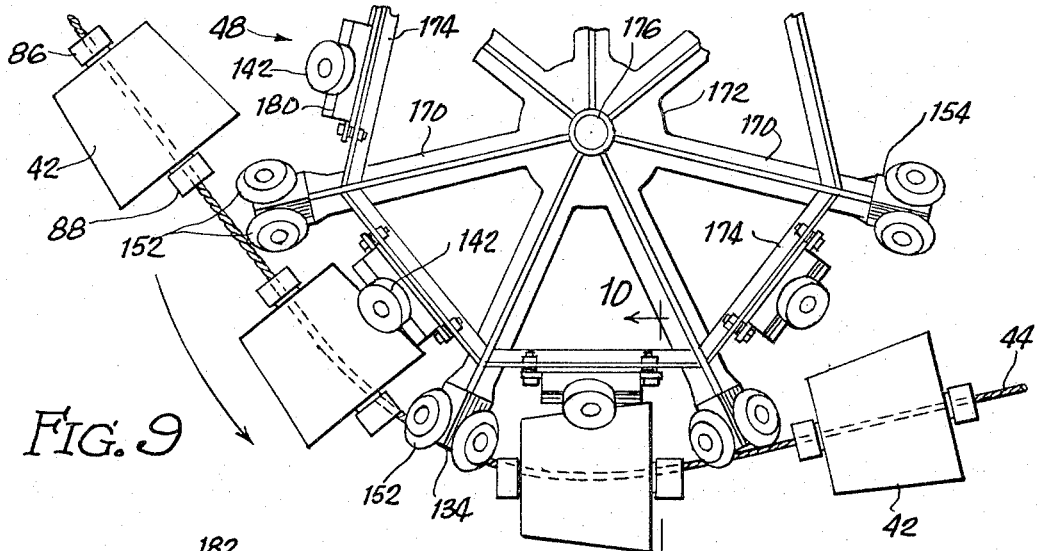
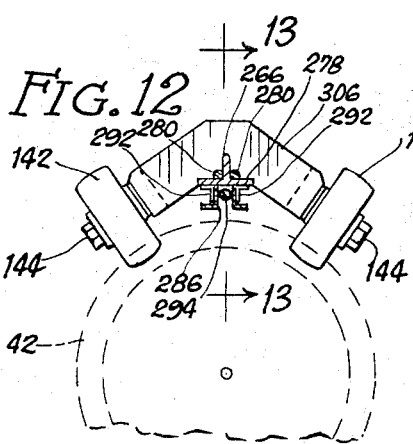
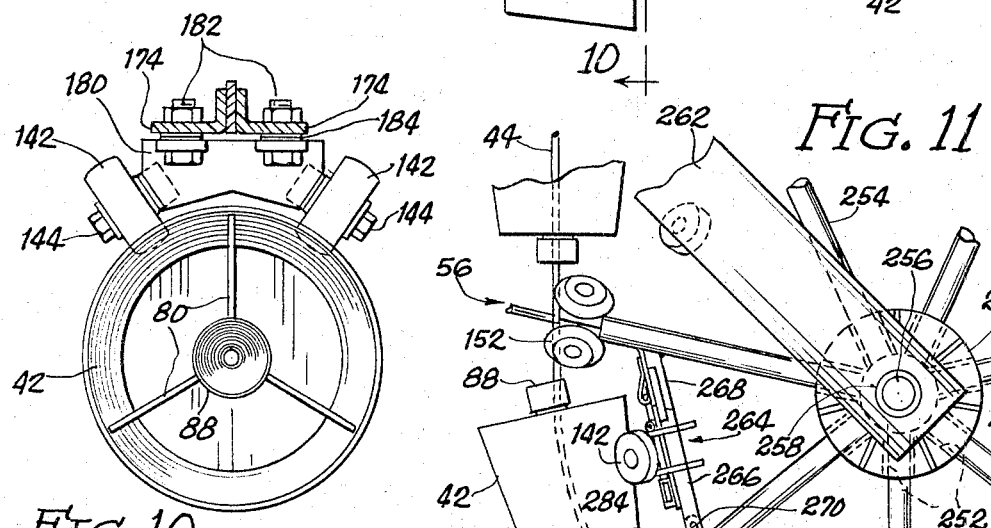
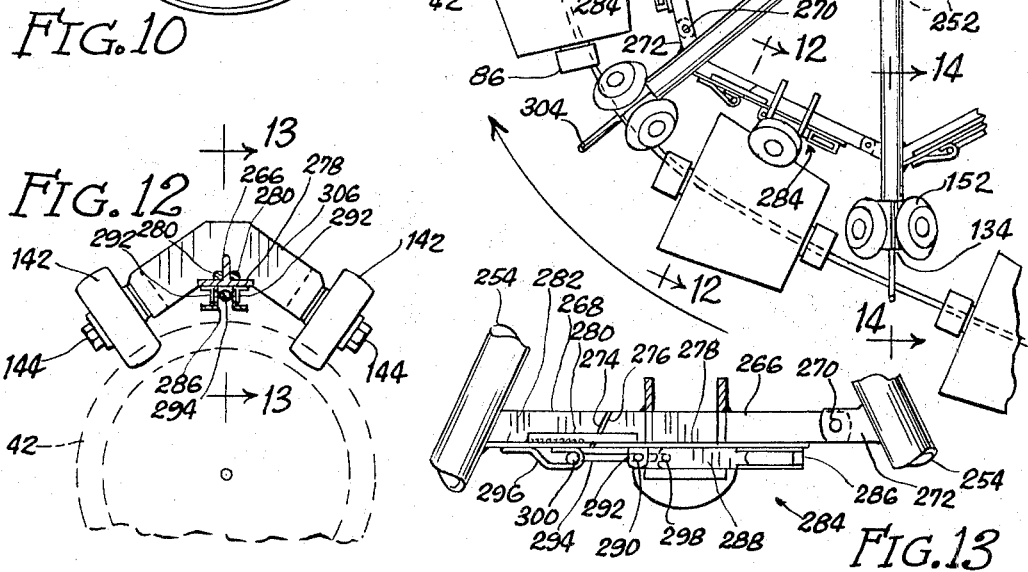

April 16, 1968  W. J. WALLACE  3,378,130
UNLOADING MACHINE FOR TANKERS OR THE LIKE
Filed Oct. 12, 1966  7 Sheets-Sheet 5

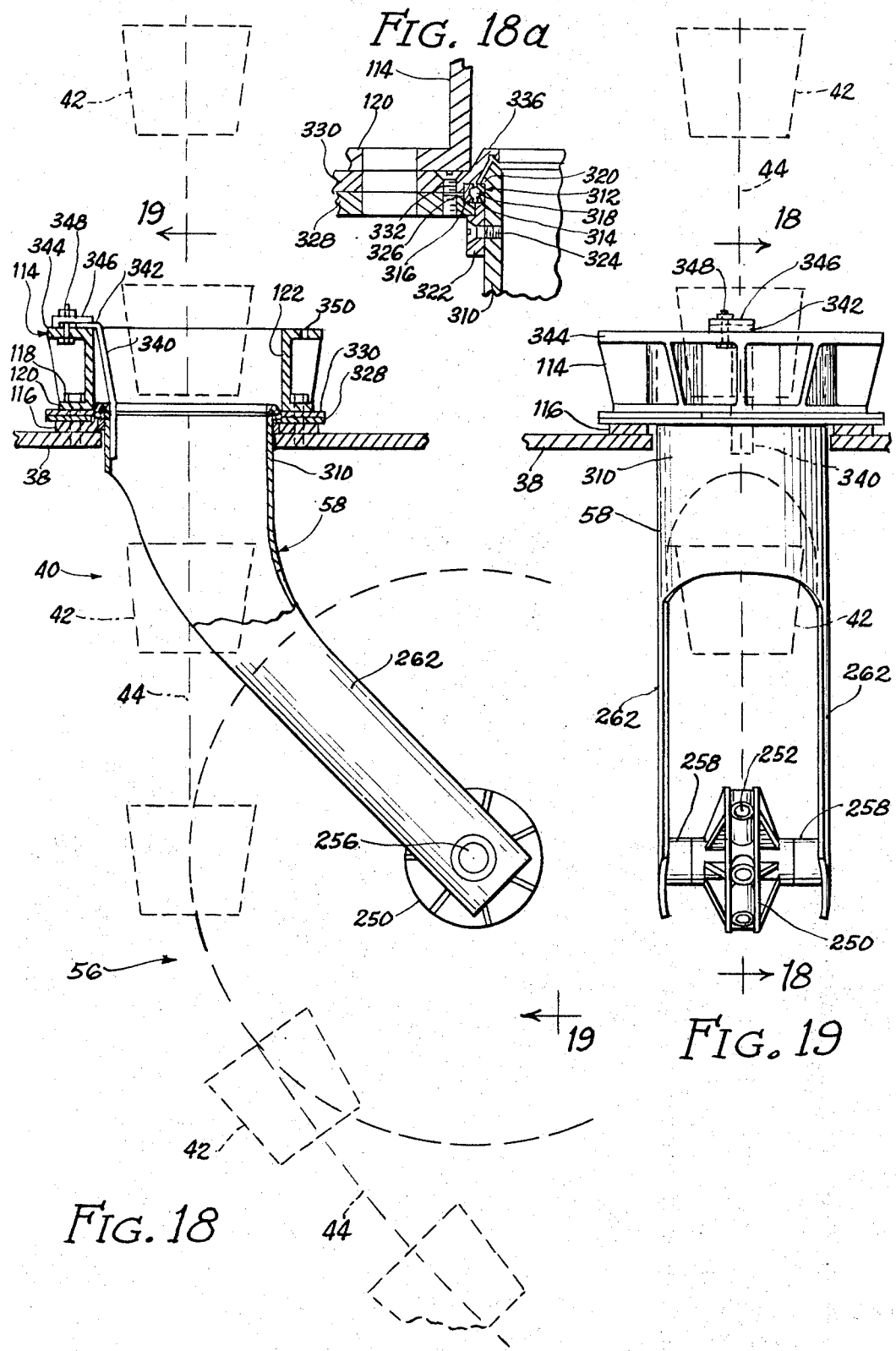

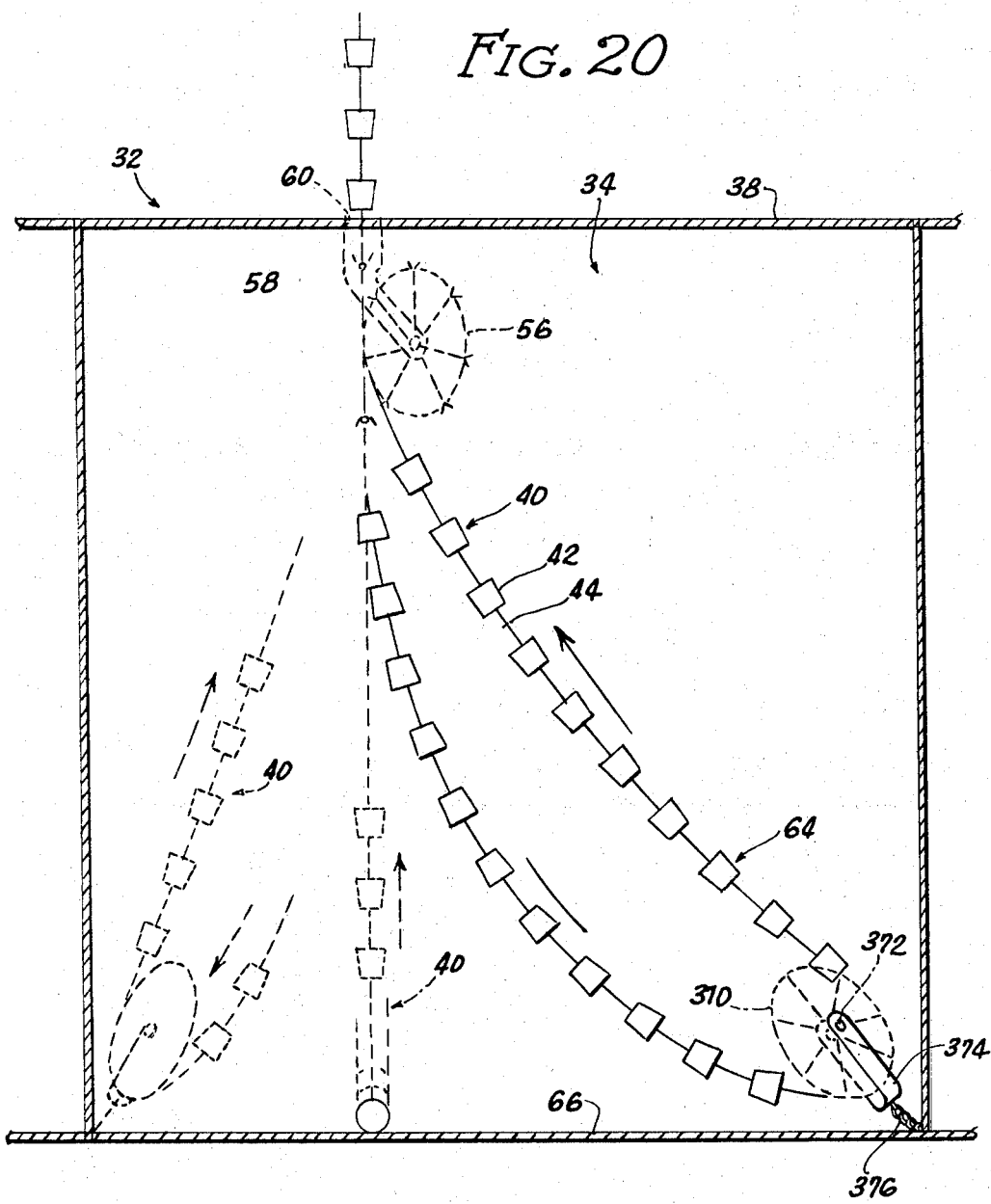

United States Patent Office 3,378,130
Patented Apr. 16, 1968

3,378,130
UNLOADING MACHINE FOR
TANKERS OR THE LIKE
Walter J. Wallace, Batavia, Ill., assignor to W. J. Wallace Systems, Inc., Batavia, Ill., a corporation of Delaware
Filed Oct. 12, 1966, Ser. No. 586,182
27 Claims. (Cl. 198—116)

ABSTRACT OF THE DISCLOSURE

An unloading machine, comprising an endless train of circular buckets with cables extending axially therebetween, at least two main wheels supporting the train of buckets, the train hanging freely in a catenary curve between said wheels, a first additional wheel for laterally deflecting said train in its downward flight from one of said main wheels, a second additional wheel for guiding said train in its upward flight to the other main wheel, a swivel mounting for said second additional wheel, at least one of said main wheels having cable supports with clusters of four rollers thereon for engaging and guiding said buckets and said cables, said wheels having bucket supports including pairs of angularly spaced rollers for engaging and supporting said buckets, and angularly spaced drive rollers on one of said main wheels for engaging the ends of said buckets to synchronize the bucket train with the wheel, the spacing between said drive rollers being greater than the spacing between said buckets so that only one bucket is driven at one time, said buckets having members therein with flaring bores for receiving said cables, said flaring bores being curved to correspond with the pitch circles of said wheels.

---

This invention relates to machines for handling bulk materials and pertains particularly to a machine which may be used very advantageously for unloading bulk materials from tanker ships or the like.

In certain aspects, the present invention may be regarded as an improvement upon the invention disclosed and claimed in my co-pending application, Ser. No. 512,038, filed Oct. 24, 1965, to be issued as Patent No. 3,282,445 on Nov. 1, 1966. The co-pending application relates to a system for handling bulk solid materials of a granular or pulverulent character. Such system is particularly well adapted for unloading bulk materials from tanker ships of the type normally employed for hauling liquid cargoes. The system of my prior invention may be installed on a tanker ship without substantially modifying the ship, so that the ship may be employed for hauling bulk materials, without impairing its usefulness for hauling liquid cargoes.

The system for my prior invention involves a machine having an endless flexible train of buckets, for digging, elevating and dumping the bulk material. The train of buckets has a free hanging loop or catenary portion adapted to be disposed below the deck of a tanker for digging and elevating the bulk material from the underlying cargo compartment of the tanker. Such catenary portion is free to swing in its own plane and also transversally to such plane, so that the train of buckets is able to dig the bulk material very efficiently from the mass of material in the tanker. The train of buckets is supported and driven by at least two and perferably three wheels or sprockets which are adapted to be disposed above the deck of the tanker. The arrangement of the wheels is such that the bulk material is dumped from the buckets onto a conveyor or other similar facility disposed above the deck. The train of buckets is constructed so that it is able to pass through the small Butterworth openings which are ordinarily provided int he deck of a tanker, for use in handling the normal liquid cargo. Thus, it is not necessary to cut any larger openings in the deck of the tanker. The system of my prior invention may readily be installed on the tanker and removed therefrom, so that the tanker may easily be converted back and forth between liquid cargo service and bulk cargo service.

One object of the present invention is to provide an unloading machine of the general character contemplated by my prior invention, but having a new and improved train of buckets, improved supporting and driving wheels, and other important improvements.

A further object is to provide a new and improved unloading machine which retains all of the advantages of my prior invention, while achieving important new advantages, such as a greatly increased hauling capacity, the ability to operate at much higher speed, a much higher degree of serviceability and resistance to wear, and much smoother operation.

It is a further object to provide such a new and improved machine in which all of these new advantages are achieved while greatly reducing the weight and cost of the machine.

One more specific object of the present invention is to provide such a new and improved unloading machine in which the buckets are circular in cross section and are joined by flexible cables extending axially relative to the circular buckets.

A further object is to provide such an unloading machine having new and improved means for connecting the circular buckets to the cables.

Another object is to provide such an unloading machine having new and improved means for protecting the cables from breakage due to excessive flexure.

It is a further object to provide such an unloading machine having a new and improved construction whereby it is easy to lengthen and shorten the train of buckets by adding buckets to the train or removing them therefrom.

A further object is to provide such an unloading machine in which the bucket train is constructed in a new and improved manner so as to prevent or minimize the tendency of the cables to twist or spin the buckets.

Another specific object is to provide an unloading machine having new and improved supporting wheels which are equipped with rollers for engaging the buckets so that they will move onto the wheels and depart therefrom in a smooth manner, without jerkiness or excessive wear.

A further object is to provide such new and improved supporting wheels having means for engaging the circular buckets and other means for engaging the cables, whereby the train of buckets is kept in a closely circular shape as it passes around the wheels, so as to avoid jerkiness in the operation of the bucket train.

A further object is to provide new and improved supporting wheels of the foregoing character in which the buckets are engaged and held outwardly by grooved arms on the supporting wheels.

It is a further object to provide a new and improved unloading machine which may be moved about to different locations very quickly and easily.

Another specific object is to provide a new and improved unloading machine having a guide wheel assembly which is adapted to be mounted just below the deck of the tanker, and which is of a demountable construction so that it may be easily and quickly assembled from a plurality of parts, all of which can be moved below the deck through the small Butterworth openings.

A further object is to provide such a new and improved guide wheel assembly which is provided with a swivel mounting so that the angle of the guide wheel may readily be changed as desired.

Another specific object is to provide an unloading machine and new and improved means for deflecting the catenary portion of the bucket train in a lateral direction transversally to the normal plane of the catenary portion.

Further objects and advantages of the present invention will appear from the following description, taken with the accompanying drawings, in which:

FIG. 2 is a longitudinal section taken through one of the circular buckets of the bucket train.

FIG. 3 is a fragmentary elevational section of the idler wheel which supports the upwardly traveling portion of the bucket train, the view being drawn to a larger scale than in FIG. 1.

FIG. 4 is an elevational view showing one of the cable assemblies, involving a cable and a pair of end fittings, for joining the circular buckets.

FIGS. 5 and 6 are sections taken generally along the lines 5—5 and 6—6 in FIG. 3.

FIG. 7 is a fragmentary plan view of the edge of the supporting wheel, showing a pair of the rollers for supporting the buckets, and taken generally as indicated by the line 7—7 in FIG. 3.

FIG. 8 is a fragmentary plan view of the edge of the wheel, showing one of the grooved supporting members for the cables, and also the guide rollers for the buckets and the cables, the view being taken generally as indicated by the line 8—8 in FIG. 3.

FIG. 9 is a fragmentary elevation of the idler wheel which is adjacent the wheel of FIG. 3 and is effective to depress the bucket train so that the bulk material may be dumped from the buckets.

FIG. 10 is a fragmentary section taken generally along the line 10—10 in FIG. 9.

FIG. 11 is a fragmentary elevation showing the demountable guide wheel which is adapted to be disposed below the deck of the tanker and adjacent the idler wheel of FIG. 3.

FIG. 12 is a fragmentary section taken generally along the line 12—12 in FIG. 11.

FIG. 13 is a fragmentary section taken generally along the line 13—13 in FIG. 12.

Figure 14:
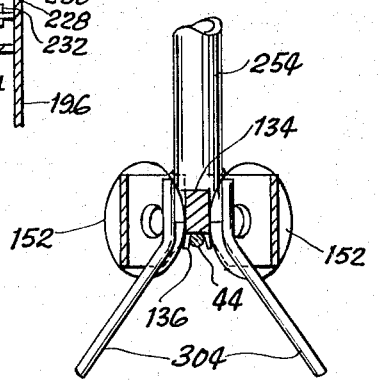

FIG. 14 is a fragmentary section taken generally along the line 14—14 of FIG. 11.

Figure 15:
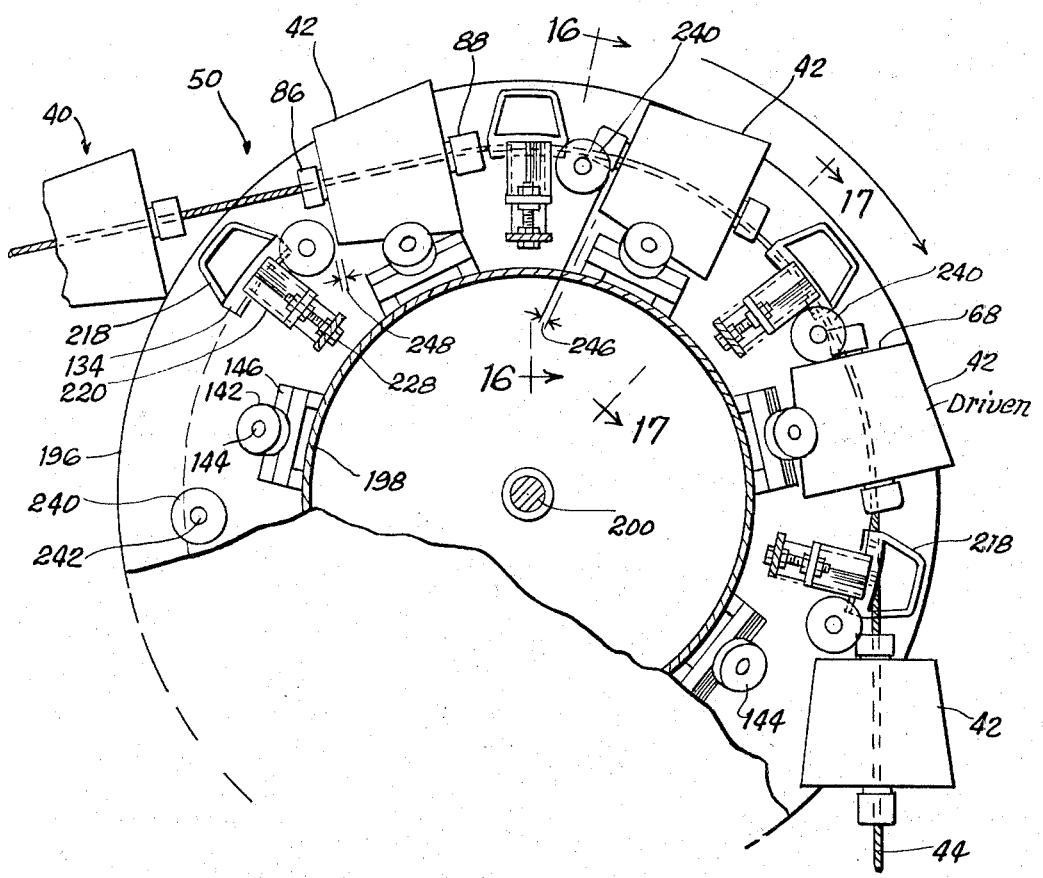

FIG. 15 is a fragmentary elevational section of the supporting wheel which drives the bucket train.

Figure 16:
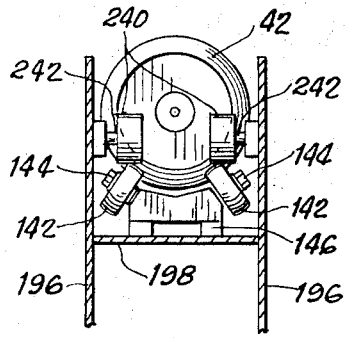
Figure 17:
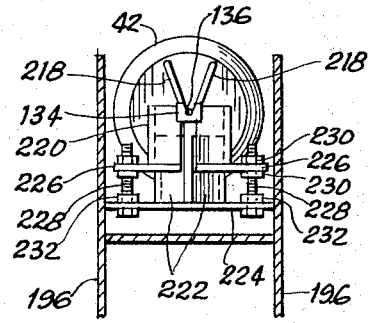

FIGS. 16 and 17 are fragmentary sections taken generally along the lines 16—16 and 17—17 in FIG. 15.

FIG. 18 is a somewhat diagrammatic elevational section showing the swivel mounting for the demountable idler wheel of FIGS. 11–14, the view being partly in section along the line 18—18 in FIG. 19.

FIG. 18a is a fragmentary enlarged section corresponding to a portion of FIG. 18.

FIG. 19 is an elevational section taken generally along the broken line 19—19 in FIG. 18.

FIG. 20 is a diagrammatic elevational section showing means for laterally deflecting the catenary portion of the bucket train.

Figure 1:
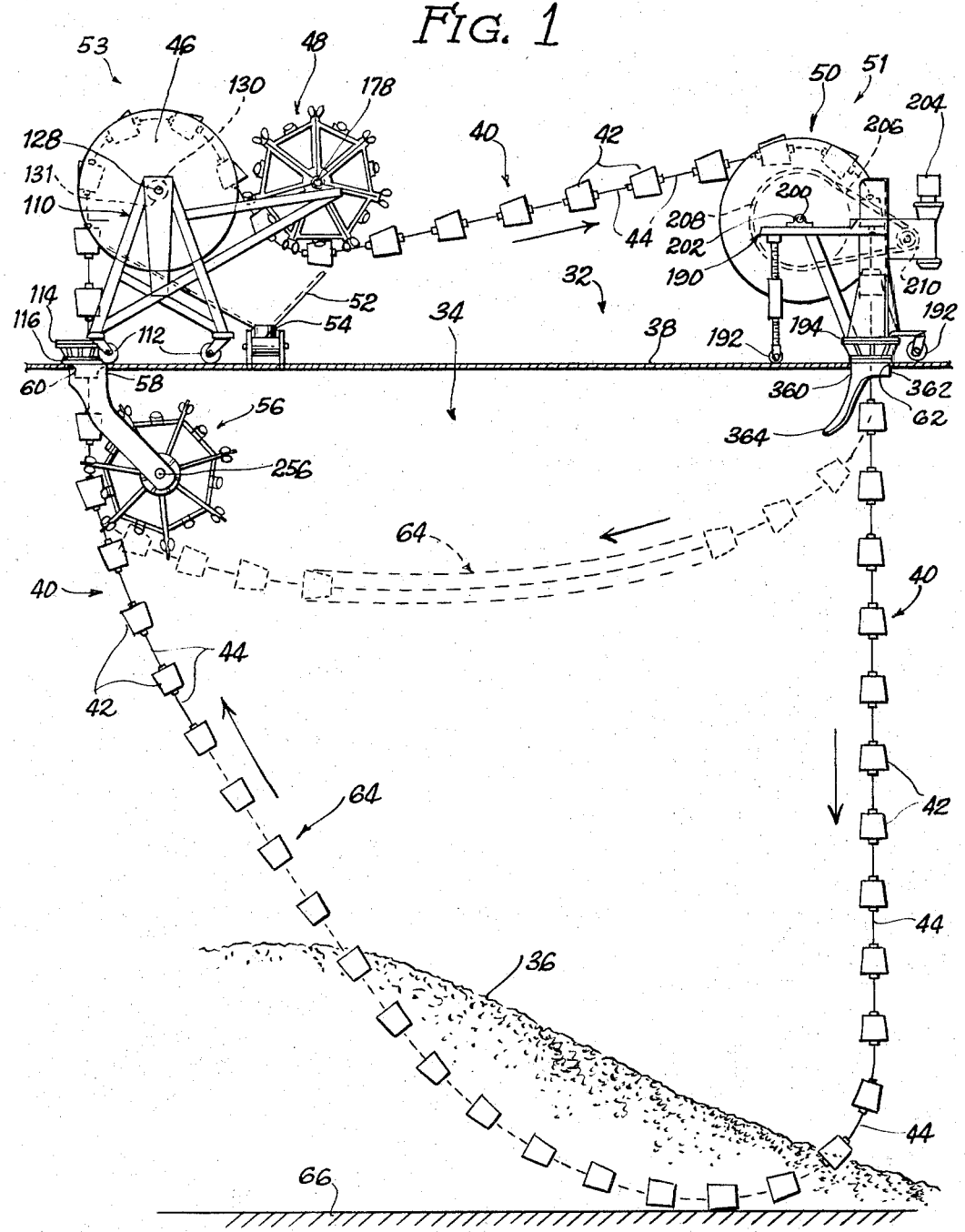
FIG. 1 is a somewhat diagrammatic elevational view, showing an unloading machine to be described as an illustrative embodiment of the present invention.

It will be seen that FIG. 1 illustrates the general construction of an unloading machine 30 which is particularly well adapted for unloading granular or other similar solid materials from tanker ships or the like. FIG. 1 illustrates the manner in which the machine 30 may be installed in a tanker 32 to unload such a solid material from one of the cargo compartments 34 thereof. The use of the machine 30 makes it economically feasible to use the tanker for hauling the granular material in bulk. In FIG. 1, a quantity of the bulk material 36 is shown in the compartment 34. The machine 30 is mounted on the deck 38 of the tanker 32.

It will be seen that the unloading machine 30 comprises an endless train 40 of buckets 42 which are employed to dig, elevate, and dump the bulk material 36. The buckets 42 are circular in cross section. The cables 44 are preferably connected axially to the buckets.

The illustrated machine 30 comprises three wheels 46, 48 and 50 which are mounted above the deck 38 and are adapted to support, guide and drive the bucket train 40. In this case, the wheel 50 drives the bucket train 40, while the wheels 46 and 48 are idler wheels. However, any of the wheels may be employed to drive the bucket train. The illustrated wheel 50 is incorporated into a driving head or unit 51, while the wheels 46 and 48 are employed in a dumping head or unit 53. Thus, the wheels 46 and 48 guide the bucket train along an S-curved path so that the buckets are inverted as they pass over the wheel 46. As a result, the solid material is dumped out of the buckets 42 and into a chute or hopper 52, which directs the solid material onto a conveyor 54. As shown, the conveyor 54 is of the endless belt type and is adapted to carry the bulk material laterally to some desired point. It will be understood that any suitable system of conveyors or the like may be provided to carry off the bulk material.

Below the deck 34, the illustrated machine 30 is equipped with a guide wheel 56 which engages the bucket train 40. The illustrated wheel 56 has a swivel mount 58 which may be turned about a vertical axis.

It will be seen from FIG. 1 that the bucket train 40 passes through a pair of small openings 60 and 62, which may be the ordinary Butterworth openings normally provided in the deck of a tanker for handling liquid cargoes.

Below the deck 38, the bucket train 40 has a generally U-shaped loop or catenary portion 64 which digs into the bulk material 36 in the compartment 34. The portion 64 tends to hang freely in the form of a true catenary curve, but is normally displaced from a true catenary by the resistance offered by the bulk material 36 to the digging effort of the bucket train. Thus, the bucket train travels downwardly from the opening 62 along a path which is vertical or nearly so, and then curves upwardly as it digs into the bulk material 36. The bucket train travels upwardly to the guide wheel 56 along an inclined path.

The length of the bucket train 40 may be changed, if desired, by inserting or removing buckets from the train, or by changing the distance between the driving and dumping heads 51 and 53.

This factor is illustrated in FIG. 1 by showing the bucket train 40 in two positions. As shown in full lines, the catenary portion 64 of the bucket train is relatively long. As shown in broken lines, the catenary portion 64 is near its minimum length. At the beginning of an unloading operation, the bulk material 36 is normally at a high level in the compartment 34. At this stage, the length of the bucket train 40 is adjusted to its minimum value, or nearly so, so that the buckets 42 drag along the top of the bulk material, with only the necessary slack in the bucket train. As the bulk material 36 is unloaded from the compartment 34, the bucket train 40 is lengthened from time to time so that the buckets 42 will continue to dig into the bulk material. When the bucket train 40 is relatively long, the buckets 42 may drag along the bottom wall 66 of the compartment 34. It will be understood that the mass of bulk material flows into the depression formed by the bucket train 40 as the buckets dig into the bulk material. Thus, the major proportion of the bulk material can be removed from the compartment 34 without resorting to auxiliary cleanup procedures. In FIG. 1, the bucket train 40 is shown in such a depression or valley.

As already indicated, the buckets 42 are preferably circular in cross section. It will be seen from FIG. 2 that each of the illustrated buckets comprises a circular bottom wall 68 and a frusto-conical side wall 70 which tapers downwardly toward the bottom wall 68. At its upper end the side wall 70 has an annular edge 72 which is adapted to dig into the bulk material 36. The upper end of each bucket 42 is open.

To provide for the connection of the cables 44, each bucket 42 is provided with an axial sleeve or tube 74 which is welded or otherwise secured to the bottom wall 68. An opening 76 is formed in the bottom wall to accommodate the sleeve 74. Due to the provision of the sleeve 74, the space 78 within each bucket 42 is annular in form. If desired, a plurality of spider arms 80 may be provided between the axial sleeve 74 and the upper portion of the side wall 70. As shown in FIGS. 2 and 10, three such arms 80 extend radially from the sleeve 74 to the side wall 70, adjacent the upper end of the bucket 42. The arms 80 may be welded or otherwise secured to the sleeve 74 and the side wall 70. If desired, each of the buckets 42 may be cast or otherwise formed in one piece.

To provide for the connection of the cables 44, each of the sleeves 74 may be formed with internally threaded portions 82 and 84 adjacent its opposite ends. One of the threaded portions 82 and 84 is preferably formed with righthand threads, while the other portion is preferably formed with left-hand threads.

As shown to best advantage in FIGS. 2 and 4, each cable 44 is preferably fitted with a pair of end fittings or bushings 86 and 88 which are adapted to be screwed into the sleeves 74 of adjacent buckets 44 in the bucket train 40. The end fittings 86 and 88 have externally threaded portions 90 and 92 adapted to mate with the internally threaded portions 82 and 84 of the sleeves 74. One of the portions 90 and 92 preferably has right-hand threads, while the other preferably has left-hand threads. The provision of the right- and left-hand threads makes it easy to assemble and disassemble the bucket train. Thus, any bucket 42 may be removed by turning it in one direction relative to both of the end fittings 86 and 88. On the other hand, rotation of the bucket in the opposite direction pulls up the end fittings 86 and 88 in the manner of a turnbuckle.

Each of the illustrated end fittings 86 and 88 has a reduced portion 94, adapted to be slipped within the sleeve 74 of the various buckets. The opposite end of each of the end fittings 86 and 88 is formed into an enlarged head 96, adapted to engage the ends of the sleeves 74. Wrench receiving openings or other formations 98 may be provided in the head 96.

As shown in FIG. 2, an axial bore 100 is formed in each of the end fittings 86 and 88 to receive the corresponding cable 44. The bore 100 extends into the reduced portion 94 of the end fitting. An annular shoulder 102 is formed at the inner end of the bore 100. At the shoulder 102, the bore 100 communicates with a flaring bore 104 which extends through the remainder of the end fitting, from the shoulder 102 to the end of the enlarged head 96.

In the illustrated construction, the cable 44 extends along the bores 100 and 104 and is retained in the bore 100 by a sleeve 106 which is swaged, welded, shrunk, or otherwise secured to the end of the cable. By a compressive swaging operation, the sleeve 106 may be irremovably secured to the end of the cable 44. The sleeve 106 fits into the bore 100 and abuts against the shoulder 102. Thus, the free portion of the cable 44 extends through the flaring bore 104.

It will be seen that the bore 104 flares gradually from a diameter corresponding to that of the cable 44 to a considerably larger diameter, only a little less than the outside diameter of the enlarged head 96. The bore 104 flares along a smooth curve. As will be evident from FIG. 2, the flaring bore 104 provides for the necessary flexure of the cable 44 but prevents excessive or abrupt flexure of the cable. Such excessive flexure or sharp bending of the cable, when often repeated, would eventually tend to cause the cable to break. The provision of the flaring bore 104 controls the flexure of the cable and obviates any such failure.

It is preferred that some of the cables 44 have a right-hand lay, while the others have a left-hand lay. The preferred arrangement is to alternate the cables so that the cables with the right-hand lay or alternated with the cables having the left-hand lay. This arrangement prevents or greatly minimizes the twisting or turning of the circular buckets 42 when the cables are put under tension. If all the cables have the same lay, the cables will tend to twist in one direction when the tension in the cables is increased. Such twisting movement of the cables will cause oscillatory twisting movement of the buckets. During the operation of the machine, the tension in the cable varies as the bucket train is moved around its endless path, because the tension is increased by the weight of the bulk material contained in the upward flight of the bucket train, and also by the driving effort which is required to circulate the train. By employing cables of alternate left- and right-hand lays, the oscillatory twisting movement of the buckets is largely obviated.

The details of the wheels 46 and 48 are shown in FIGS. 1, 3, and 5–10. It will be seen from FIG. 1 that the illustrated wheels 46 and 48 are provided with a supporting frame 110 which is adapted to be mounted on the deck 38. Casters or wheels 112 are preferably provided on the frame 110 so that it may easily be rolled to any desired position on the deck 38. However, when the unloading machine is in actual use, the frame 110 is securely bolted, clamped or otherwise secured to the deck 38. For this purpose, the illustrated frame 110 is provided with a reinforced ring 114 which may be bolted to the deck 38 around the desired Butterworth opening 60 therein. Normally, the deck 38 is provided with a bolt-receiving flange 116 which is welded or otherwise secured to the deck around each Butterworth opening 60. As shown to best advantage in FIGS. 18 and 18a, the flange 116 may be tapped to receive bolts or screws 118 which are employed to secure the ring 114 to the deck 38. At its lower end, the ring 114 is provided with a flange 120 having openings therein to receive the bolts 118.

It will be evident that the frame 110 may be secured to and detached from the deck 38 very easily simply by inserting and removing the bolts 118. Thus, the frame 110 may easily be moved to any of the Butterworth openings 60 which are formed in the deck 38. The ring 114 is formed with an opening 122 through which the buckets 42 are adapted to pass upwardly to the idler wheel 46.

As previously indicated, the idler wheels 46 and 48 serve the purpose of inverting the buckets 42 so that the granular material contained therein will be dumped onto the conveyor 54. To confine and direct the granular solid material, the first idler wheel 46 is provided with a pair of circular side walls or plates 124 and a drum shaped cylindrical inner wall 126. The side walls 124 are spaced apart by the drum shaped wall 126 and are welded or otherwise secured thereto. The wheel 46 is fitted with a shaft 128 which is secured to the side walls 124. The shaft 128 is supported by suitable bearings 130 on the frame 110. An anti-retrograde device 131 is associated with at least one of the bearings 130 to prevent the wheel from turning backwards under the weight of the bucket train, when the bucket train is not being driven.

It will be seen from FIGS. 5 and 6 that the side walls 124 and the drum 126 form a channel 132 in the outer edge of the wheel 46. The channel 132 is adapted to receive the bucket train 40. Means are provided within the channel 132 to support the successive buckets 42 and cables 44. A plurality of members or shoes 134 are provided to support the cables 44. The members 134 are formed with grooves 136 to receive the cables 44. The members 134 and the grooves 136 are arcuately curved so that each cable will be correspondingly curved when it is supported by the member. The grooved members 134 are preferably mounted on the outer ends of radial arms 138 which project outwardly in the center of the channel 132. All of the arms 138 may be formed on a ring 140 which is welded or otherwise secured to the drum 126, as shown to best advantage in FIGS. 3 and 6.

The wheel 46 is preferably provided with rollers 142 to support the buckets 42. As shown to best advantage in FIGS. 3, 5 and 7, two sets of rollers 142 are preferably provided to support each bucket 42. The rollers 142 of each pair are mounted on pivots or axles 144 which are supported by a bracket 146. As illustrated in FIG. 5, the axles 144 are inclined so that the rollers 142 are disposed in generally radial planes, relative to the axis of the bucket 42.

The bracket 146 may be secured to the drum 126 by means of bolts 148 or the like. If desired, washers or shims 150 may be provided on the bolts 148 between the drum 126 and the bracket 146 to adjust the radial position of the rollers 142. By adjusting the number and thickness of the shims 150, the rollers 142 are positioned so that they support the buckets 42 with their axes at the same radius as the pitch radius of the cables 44 when they are supported by the grooved members 134.

The wheel 46 functions in somewhat the same manner as a sprocket wheel to support the bucket trains 40, which functions in much the same manner as an endless chain. To guide and assist the movement of the bucket train 40 onto and off the wheel 46, a plurality of guide rollers 152 are provided on the wheel 46. In the illustrated construction, four of the rollers 152 are clustered on each of the arms 138, adjacent each of the grooved members 134. The rollers 152 guide the cables 44 onto and off the grooved members 134, while also guiding the buckets 42. It will be seen that the rollers 152 are also engageable with the end fittings or bushings 86 and 88 which are screwed into the buckets 42.

To support the rollers 152, each of the arms 138 is provided with a pair of angle-shaped brackets 154 which may be welded or otherwise secured to the arm 138. The rollers 152 are mounted on axles 156 which are screwed into or otherwise secured into the brackets 154. It will be seen that the axles 156 extend at approximately 45 degrees to the radial plane of the cables 44. The axles 156 of the four rollers 152 are at angles of 90 degrees to one another.

Each of the rollers 152 has a periphery which is generally V-shaped in cross section so as to provide two frusto-conical surfaces 158 which extend generally at 90 degrees to each other. One of the frusto-conical surfaces 158 of each roller 152 is adapted to engage and guide the cables 44, while the other frusto-conical surface is adapted to engage the end faces 160 of the bushings 86 and 88 on the buckets 42.

The rollers 152 provide a smooth rolling action as the buckets 42 move into and out of mesh with the wheel 46. The rollers 152 minimize the friction between the buckets 42 and the wheel 46, and also between the cables 44 and the wheel 46. The rollers 152 insure that the bucket train 40 will move very smoothly over the wheel 46. In the event that there is any tendency for the wheel 46 to get out of step with the bucket train 40, the rollers 152 engage the bushings 86 and 88 on the buckets 42 and bring the wheel back into step with the bucket train.

While the rollers 152 keep the wheel 46 in step with the bucket train 40, the rollers 142 hold the buckets 42 outwardly so that the axis of each bucket will be at substantially the same radius as the pitch radius of the grooves 136 in the members 134. The wheels 142 insure that the bucket train 40 will pass smoothly over the wheel 46 with a minimum of jerking due to the chordal action of the cables 40. As the bucket train 40 passes over hte wheel 46, almost all portions of the cables 44 are supported along arcuate portions of the same pitch circle, rather than extending along chords of such circle. It will be seen from FIG. 3 that the portions of the cables 44 which are supported by the grooved members 134 and the bushings 86 and 88 extend along the pitch circle. The curvature of the flared bores 104 in the bushings 86 and 88 corresponds approximately to the curvature of the pitch circle. The only unsupported portions of the cables 44 are the extremely short portions which extend between the bushings and the grooved members 134. Even these unsupported portions are extremely close to the pitch circle so that there is very little jerking as the bucket train passes onto and off the wheel 46.

It will be seen from FIG. 1 that the bucket train 40 passes over the wheel 46 and then under the wheel 48. The bucket train 40 engages the wheel 46 for somewhat less than 180 degrees, while engaging the wheel 48 for somewhat less than 90 degrees.

The wheel 48 could be the same in construction as the wheel 46. However, the illustrated wheel 48 is of a somewhat different construction in that it is of skeletal construction, comprising a plurality of arms 170 which radiate from a hub 172. A plurality of reinforcing bars 174 extend between the arms 170 adjacent their outer ends and are arranged to form a polygon. In this case, there are seven of the arms 170 and seven of the bars 174. The wheel 48 has a supporting shaft 176 which is mounted in bearings 178 on the frame 110.

The wheel 48 has substantially the same grooved members 134, supporting rollers 142, and guide rollers 152, as the wheel 46. In the case of the wheel 48, the grooved members 134 are mounted on the ends of the radial arms 170. Similarly, the supporting brackets 154 for the rollers 152 are mounted on the outer ends of the arms 170. Modified brackets 180 are provided to support the axles 144 of the rollers 142, as shown to best advantage in FIG. 10. Bolts 182 are preferably employed to secure the brackets 180 to the bars 174. As before, shims 184 may be employed between the bars 174 and the brackets 180 to adjust the positions of the rollers 142 so that the axes of the buckets 42 will be along the pitch circle of the grooved members 134.

It will be seen from FIG. 1 that the bucket train 40 passes from the wheel 48 to the wheel 50, along a path which is generally horizontal, but is inclined upwardly at a small angle. The bucket train 40 passes over the wheel 50 and down through the adjacent opening 62 in the deck 38. It will be evident that the bucket train 40 engages the wheel 50 through an angle of somewhat more than 90 degrees.

The illustrated wheel 50 is mounted on a separate frame 190 which is supported on the deck 38. As before, the frame 190 may be provided with wheels or casters 192 so that the frame may be moved very easily to various locations on the deck 38. When the unloading machine is in actual use, the frame 190 is secured to the deck. Thus, the illustrated frame 190 comprises a reinforced ring 194 which is similar to the ring 114 and is adapted to be bolted to the deck 38 around the Butterworth opening 62, in much the same manner as previously described.

The wheel 50 could be the same as the wheel 46, but is preferably of a modified construction. In this case, the wheel 50 is employed to drive the bucket train 40. On the other hand, the wheels 46 and 48 are idler wheels which are driven by the bucket train.

The wheel 50 is similar to the wheel 46 in that the wheel 50 comprises a pair of circular side walls or plates 196 which are welded or otherwise secured to the opposite ends of a cylindrical inner wall or drum 198. The wheel 50 has an axle 200 which is secured to the plates 196 and is mounted in bearings 202 supported by the frame 190.

The wheel 50 may be driven by a motor 204 mounted on the frame 190. It is preferred to employ a hydraulic motor, but any other suitable type of motor may be employed. A suitable drive is employed between the motor 204 and the wheel 50. As shown, the drive comprises an endless chain 206 which is strung around large and small sprockets 208 and 210. The large sprocket 208 is connected to the wheel 50, while the small sprocket 210 is driven by the motor 204. If desired, the chain and sprocket drive may be replaced with a belt and pulley drive.

To engage the cables 44, the wheel 50 is provided with the same grooved members or shoes 134 as previously described in connection with the wheel 46. In this case, a pair of converging guides 218 are mounted on each member 134 to guide the cables 44 into the groove 136 therein. Each of the illustrated guides 218 is in the form of a rod, bent into a U-shaped form and welded or otherwise secured to the member 134. Such guides may also be employed on the wheels 46 and 48, if desired. To illustrate this point, the guides 218 are shown on the wheel 46 in FIGS. 3, 6 and 8.

As shown in FIGS. 15 and 17, the grooved members 134 are adjustably mounted on the wheel 50. Each member 134 is preferably welded or otherwise secured to a pair of angle-shaped members 220 which are telescopically mounted on a similar pair of guide angles 222. It will be seen that the angles 222 are welded or otherwise secured to a bar 224 which is connected between the side plates 196. The bar 224 may be welded or otherwise secured to the side plates 196.

As shown in FIG. 17, the angle members 220 are welded or otherwise secured to bars 226 which are adjustably connected to the bar 224 by means of bolts 228. In the illustrated construction, each bar 226 is clamped between a pair of nuts 230 which are mounted on the corresponding bolt 228. Thus, the radial position of the grooved member 134 may be adjusted by moving the nuts 230. Additional nuts 232 may be employed to clamp the bolts 228 to the bar 224. Shims or spacers could also be employed to adjust the positions of the bars 226 on the bolts 228.

As before, the wheel 50 is provided with a plurality of pairs of the rollers 142 for engaging and supporting the buckets 42, so that the axis of each bucket 42 will be at the same radius as the pitch radius of the grooved members 134. The axles 144 and brackets 146 for the rollers 142 are substantially the same as previously described. As before, the brackets 146 may be adjustably mounted on the drum 198.

The wheel 50 is provided with a plurality of rollers 240 for engaging the buckets 42 so as to drive the bucket train 40. While the rollers 240 correspond generally to the rollers 152 of the wheel 46, the rollers 240 are adapted to engage the buckets 42 directly, rather than engaging the bushings 86 and 88. It will be evident from FIG. 15 that the rollers 240 are adapted to engage the bottom wall 68 of each bucket in turn. Rather than being mounted at inclined angles, the rollers 240 are preferably mounted with their axes parallel to the axis of the wheel 50. The rollers 240 are preferably arranged in pairs to engage the bottom wall 68 of each bucket 42 on opposite sides of the cables 44. As shown in FIG. 16, the rollers 240 are mounted on axles 242 which are secured to and supported by the side plates 196. It will be seen that the axles 242 for each pair of rollers are disposed along the same axis.

It will be understood that the rollers 240 exert the necessary driving effort upon the buckets 42. Thus, the rollers 240 apply considerable force to the buckets 42. To provide for smooth operation of the wheel 50, it is preferred to arrange the rollers 240 so that only one pair of rollers is driving one bucket at any one time. As the wheel 50 is rotated, each bucket in turn is driven by the corresponding pair of rollers 240. Thus, it will be seen from FIG. 15 that the arcuate spacing between the rollers 240 is somewhat greater than the arcuate spacing between the adjacent buckets 42 in the bucket train. With this arrangement, only one of the buckets 42 will be driven by the rollers 240 at any one time. The legend "Driven" has been applied to the driven bucket in FIG. 15. It will be seen that the corresponding pair of rollers 240 are in engagement with the bottom 68 of the driven bucket 42. The bucket which is behind the driven bucket in the bucket train 40 is not being driven, because a definite spacing exists between such bucket and the corresponding rollers 240. In FIG. 15, such spacing is indicated at 246. This spacing represents the difference between the arcuate distances between the rollers 240 and the buckets 42.

As a result of this construction, the buckets 40 move onto the wheel 50 without immediately engaging the rollers 240. Thus, there is initial clearance between each bucket 42 and the corresponding rollers 240. Such clearance is indicated at 248 in FIG. 15. It will be seen that the second bucket 42 behind the driven bucket is moving onto the wheel 50, and that the clearance indicated at 248 exists between such second bucket and the corresponding rollers 240.

Each bucket 42 in turn becomes the driven bucket, as the previous bucket moves away from the wheel 50. In FIG. 15, the bucket ahead of the driven bucket has moved away from the wheel 50 to such an extent that it has moved out of engagement with the corresponding rollers 240. As each driven bucket moves out of engagement with the corresponding rollers, the load shifts to the succeeding bucket, which shifts back to a slight extent into engagement with the corresponding rollers 240. Because of the provision of the rollers 142 and 240, this slight shifting of the buckets is accomplished very smoothly. The shifting movement is accompanied by slight rolling movement of the rollers 142 and 240.

The demountable wheel 56 is similar in construction to the wheels 46 and 48, except that the demountable wheel can readily be assembled below the deck 38 from components which are small enough to be passed downwardly through the Butterworth openings 60 and 62 in the deck. The details of the wheel 56 are shown in FIGS. 11–13, 18, 18a and 19. It will be seen that the wheel 56 comprises a hub 250 having a plurality of sockets 252 for receiving tubular spokes or arms 254 which extend radially from the hub. The wheel 56 has an axle 256 which is mounted in bearings 258 supported by the swivel supporting member 58. It will be seen from FIG. 19 that the supporting member 58 is forked and thus is formed with a pair of arms 262 on which the bearings 258 are mounted. Additional details of the supporting member 58 will be described presently.

As shown to best advantage in FIGS. 11–13, bars or braces 264 are provided between the radial arms 254 adjacent the outer ends thereof. Each brace 264 is preferably constructed so that it may be opened or separated into two parts. In this way, the arms 254 may be removed from the hub 250 so that the wheel 56 may readily be disassembeld.

Thus, each of the braces 264 comprises a movable portion 266 and a fixed portion 268. The illustrated portions 266 and 268 are in the form of T-bars. The fixed portion 268 is welded or otherwise secured to one of the adjacent arms 254. The movable portion 266 is swingably mounted on the other arm 254. Thus, one end of the movable portion 266 is swingable about a pivot 270 which is connected to a lug 272 on the adjacent arm 254. It will be seen that one of the movable portions 266 and one of the fixed portions 268 are mounted on each arm 254.

The movable and stationary portions or bars 266 and 268 are formed with diagonal end surfaces 274 and 276 which are opposite each other when the movable bar 266 is swung into its normal position, as shown in FIGS. 11 and 13. The movable T-bar 266 has flanges 278 which engage stop bars 280, welded or otherwise secured to the flanges 282 of the fixed T-bar 268.

To provide for the quick assembly and disassembly of the wheel 56, the movable and fixed bars or portions 266 and 268 are preferably joined by clamps or latches 284. As illustrated, the latches 284 are of the toggle or overcenter type. Thus, each of the illustrated clamps 284 comprises a U-shaped toggle lever 286 having a pair of spaced arms 288 which are swingable about pivots 290. It will be seen from FIGS. 12 and 13 that the pivots 290 are connected to a pair of lugs or brackets 292 which are welded or otherwise secured to the flanges 278 of the movable T-bar 266. A toggle link 294 is connected between the lever 288 and a pair of hooks 296 which are welded or otherwise secured to the flanges 282 of the fixed T-bar 268. Pivots 298 ad 300 are welded or otherwise secured to the opposite ends of the toggle link 294. The pivot 298 extends into corresponding openings which are formed in the arms 288. The pivot 300 is removably received in the hooks 296

When the toggle lever 286 is swung into its closed position as shown in FIGS. 11 and 13, tension is exerted on the toggle link 294 so that the movable and fixed bars 266 are drawn together. The tension exerted by the various clamps 284 has the effect of clamping the arms 254 into the hub 250 so that the entire wheel 56 becomes a rigid structure.

When the wheel 56 is to be disassembled, the lever 286 of each clamp is swung outwardly about the pivots 290 so as to move the toggle link 294 over-center until the tension is relieved therein. The toggle link swings about the pivot 300. When the clamp 284 has been loosened, the pivot 300 can be separated from the hooks 296 by swinging the toggle link 294 laterally.

When the arms 254 have been removed from the hub 250, the bars 266 can be folded against the arms so that each arms is compact enough to be passed through the Butterworth openings 60 and 62.

The wheel 56 is similar to the wheel 46, in that the wheel 56 is provided with the same grooved members 134 for engaging the cables 44. The same guide rollers 152 are also employed on the wheel 56, to engage and guide the cables 44 and the end fittings or bushings 86 and 88. In the case of the wheel 56, however, the grooved members 134 and the rollers 152 are mounted on the outer ends of the demountable arms 254. If desired, each grooved member 134 may be provided with a pair of converging guide rods 304 for guiding the cables 44 onto the grooved members. The guide rods 304 are similar to the rods 218 of FIG. 17. The guides 304 may be employed on any of the wheels, if desired.

The wheel 56 is also provided with the same rollers 142 as employed on the wheel 46. As before, the rollers 142 are employed in pairs to hold the buckets 42 outwardly between the grooved members 134. The axles 144 for the rollers 142 are mounted on modified brackets 306 which are welded or otherwise secured to the movable T-bars 266, as shown to best advantage in FIGS. 12 and 13.

It is preferred to provide a swivel mounting for the demountable wheel 56. The details of the swivel mounting are shown to best advantage in FIGS. 18, 18a and 19. It will be seen that the supporting member 58 for the wheel 56 is provided with an upper portion 310 which is tubular or cylindrical in form and is adapted to extend through the Butterworth opening 60 in the deck 38. The tubular member 310 is rotatably supported by a suitable bearing 312, so that the entire member 58 can be swiveled about the vertical axis of the Butterworth opening 60. The illustrated bearing 312 is of the ballbearing type and is provided with inner and outer races 314 and 316, with a plurality of balls 318 therebetween. The inner race 314 is mounted around the tubular member 310 and is retained between a flange 320 and a removable ring 322 thereon. The flange 320 may be formed integrally with the member 310. Screws 324 may be employed to fasten the ring 322 to the member 310.

The outer race 316 is adapted to be mounted on the deck 38 around the Butterworth opening 60. In the illustrated construction, the race 316 is confined in a groove 326 which is formed by a pair of mounting plates 328 and 330. Screws 322 may be employed to fasten the plates 328 and 330 together. As shown in FIG. 18a, the plates 328 and 330 are adapted to be clamped between the ring 114 and the deck flange 116. Thus, the mounting bolts 118 extend through suitable openings in the plates 328 and 330.

As shown in FIG. 18a, the upper mounting plate 330 is formed with an inwardly projecting flange 336 which overhangs the upper end of the tubular member 310 and is adapted to exclude the granular material from the bearing 312. Various other sealing arrangements may be provided for the bearing 312.

Means are preferably provided for clamping or locking the supporting member 58 in any position to which it may be swiveled. As shown in FIG. 18, an upwardly projecting arm or bar 340 is welded or otherwise secured to the tubular portion 310 of the member 58. The arm 340 projects upwardly through the ring 114. At its upper end, the illustrated arm 340 is provided with a horizontal flange 342 which is engageable with the upper side of the ring 114. It will be seen that a flange 344 is provided on the upper end of the ring 114. A suitable clamp 346 is mounted on the flange 344 and is adapted to engage the flange 342 on the arm 340. A screw 348 is provided to actuate the clamp 346. A series of holes 350 may be provided in the flange 344 to receive the screw 348 so that the clamp 346 may be moved to various locations around the flange 344. It will be understood that various other arrangements may be provided to clamp or lock the swivel member 58 in any desired position.

The swivel supporting member 58 is sufficiently small in size to be inserted through the Butterworth opening 60 in the deck 38. When the arms 254 of the demountable wheel 56 are removed, the hub 250 is sufficiently small to be inserted through the Butterworth opening, without removing the hub from the arms 262. It will be seen that the arms 262 are curved or angled laterally so that the bucket train 40 will move along a vertical path between the wheel 56 and the Butterworth opening 60. The buckets 42 pass through the tubular upper portion 310 of the swivel supporting member 58.

As shown in FIG. 1, it is preferred to provide a guide member 360 which extends through the Butterworth opening 62 and is adapted to guide the downward flight of the bucket train 40. The guide 360 has a tubular upper portion 362 which extends through the Butterworth opening 62. The tubular portion 362 preferably has a swivel mounting, which may be the same as the swivel mounting for the supporting member 58. Thus, the guide 360 may be swiveled to any position relative to the ring 194 on the frame 190.

The illustrated guide 360 has a curved arm 364 which extends downwardly and curves laterally from the tubular member 362. The curved arm 364 is adapted to engage and guide the buckets 42.

It will be evident that the guide 360 keeps the bucket train on a substantially vertical path as the bucket train moves downwardly from the drive wheel 50 and through the Butterworth opening 62. Thus, the guide 360 insures that the bucket 42 will move smoothly through the ring 194 and the Butterworth opening 62.

In the usual case, the bucket train 40 hangs freely between the guide wheel 56 and the guide member 360, so that the bucket train hangs in a vertical plane, as represented by the central position of the bucket train in FIG. 20. The buckets 42 dig into and elevate the bulk solid material 36. As the bulk material is removed, the remaining material flows by gravity toward the bucket train so that most of the material can be removed without moving the bucket train to a new location. The bucket train can be moved laterally to some extent by adjusting the swivel supporting member 58 and thereby changing the angle of the guide wheel 56. By utilizing various Butterworth openings in the deck 38, almost all of the bulk material can be removed from the various compartments of the ship.

FIG. 20 illustrates the manner in which the bucket train 40 may be displaced laterally from its usual vertical plane so that a greater proportion of the bulk material can be removed from the compartment 34 of the ship. As shown, the bucket train is displaced laterally by utilizing an additional guide wheel 370 which may be similar to the demountable guide wheel 56. The guide wheel 370 engages the bucket train 40 at or near the lower end of the downward flight thereof. It will be seen that the wheel 370 has an axle 372 which is supported by a U-shaped member 374. A chain or cable 376 is employed to tether the member 374 at various locations along the lower portion of the compartment 34. The anchoring point for the chain

Summary of operation

While the operation of the unloading machine 30 has already been described, a brief summary may prove to be helpful. The machine 30 may be transported and shipped in four basic units, comprising the bucket train 40, the dumping head or unit 53, the driving head or unit 51, and the demountable guide wheel 56, with its swivel support 58 and other associated components. The dumping head 53 comprises the idler wheels 4 and 48, the supporting frame 110, and the other associated components. The driving head 51 comprises the driving wheel 50, the frame 190, the motor 204, the guide 360, and the associated components. The guide wheel 370 of FIG. 20 constitutes another basic unit if used. All of the basic units are light in weight and easy to transport and set up.

In erecting the machine 30, the swivel support 58 and the various parts for the demountable guide wheel 56 are inserted through the Butterworth opening 60 in the deck 38. The swivel support 58 is mounted within the Butterworth opening in the manner illustrated in FIGS. 18, 18a and 19. The wheel 56 is assembled by inserting the arms 254 into the sockets 252 in the hub 250. The swingable bars 266 are then swung into alignment with the fixed bars 268, and the toggle latches 284 are closed to unite the wheel 56 into a rigid unit.

The ring 114 on the frame 110 of the dumping head is bolted to the deck 38 around the Butterworth opening 60, in the manner shown in FIGS. 1 and 18. In this way, the frame 110 is fastened securely to the deck.

The guide 360 is mounted in the other Butterworth opening 62 which is to be employed, and the ring 194 is bolted to the deck around such Butterworth opening. In this way, the frame 190 is secured to the deck. The frames 110 and 190 are oriented so that the wheels 46, 48 and 50 are in a common plane.

The bucket train 40 may then be mounted on the wheels 46, 48, 50 and 56. This is done simply by opening the endless bucket train at one point and threading the train through the rings 114 and 194 and around the wheels 46, 48, 50 and 56. It is easy to open the endless bucket chain by unscrewing one of the buckets 42 from both of the end fittings 86 and 88 which are attached thereto. The bucket train may be reassembled by screwing the bucket back onto the end fittings.

Enough buckets are introduced into the bucket chain to give the desired length thereto. Normally, the initial level of the bulk granular material 36 in the compartment 34 is quite high. To accommodate this situation, the initial length of the bucket train 40 is normally made quite short, somewhat as indicated in broken lines in FIG. 1, so that the buckets 42 will drag along the top of the bulk material 36, with only a minimum of slack in the bucket train. As the bulk material is removed from the compartment 34, the machine 30 is stopped occasionally so that additional buckets 42 and cables 44 may be added to the train, to accommodate the reduced level of the bulk material in the compartment. At its maximum length, the bucket train 40 may drag along the bottom wall 66 of the compartment 34, somewhat as shown in full lines in FIG. 1.

The buckets 42 dig into the bulk material 36 so that each bucket picks up a substantially full load of the material. While the bucket train 40 tends to hang in a free catenary curve between the guide 360 and the guide wheel 56, the engagement of the bucket train with the bulk material causes the bucket train to shift into a modified curve, somewhat as shown in FIG. 1. The bulk material 36 offers resistance to the digging effort of the buckets 42, with the result that the bucket train descends from the guide 360 at a steeper angle than it ascends to the guide wheel 56.

The guide wheel 56 directs the bucket train 40 vertically through the Butterworth opening 60 and the ring 114, and thence to the guide wheel 46. The wheels 46 and 48 have the effect of inverting the buckets so that the granular material is dumped from the buckets. The dumped material is carried off by the conveyor 54 or any other suitable means. It will be seen from FIG. 1 that the buckets 42 travel upwardly to the wheel 46, over the wheel, and downwardly to the wheel 48. From the wheel 48, the buckets travel generally in a horizontal direction to the driving wheel 50. The wheel 48 has the effect of depressing the path of the bucket train 40 so that the buckets 42 are effectively dumped adjacent the wheel 46.

The wheel 50 is driven by the motor 204 and is effective to drive or circulate the bucket train 40. From the wheel 50, the bucket train passes downwardly through the ring 104 and the guide 360.

If the lower guide wheel 370 is employed, as shown in FIG. 20, the bucket train is threaded around the wheel 370. It will be evident that the wheel 370 is effective to deflect the bucket train 40 out of its normal vertical plane so that the bucket train will be able to remove a greater proportion of the bulk material from the compartment 34. The normal procedure is to remove most of the bulk material 36 from the compartment 34 without using the lower guide wheel 370. The machine may be moved to various pairs of Butterworth openings to remove as much of the bulk material as possible. Moreover, the swivel support 58 may be turned slightly to change the angle of the guide wheel 56 so as to increase the coverage of the bucket train. It will be understood that the bulk material flows by gravity toward the bucket train as the bucket trains digs into the mass of bulk material. The lower guide wheel is installed and used to enable the bucket train 40 to pick up most of the remaining bulk material in the compartment 34. Thus, the use of the lower guide wheel 370 minimizes the amount of cleanup which is necessary to remove all of the bulk material. When the lower guide wheel 370 is used, the swivel mount 58 for the guide wheel 56 is turned so as to adjust the wheel 56 to the most favorable angle. Similarly, the guide 360 is swiveled to the appropriate angle.

The bucket train 40 is extremely strong and flexible, because of the provision of the cables 44 to connect the buckets 42. Moreover, the cables 44 are extremely light in weight so that a minimum of power is required to circulate the bucket train. Due to the provision of the cables, the load carrying capacity of the bucket train is very high.

The flexibility of the cables 44 makes it possible for the bucket train to pass around the various wheels in an extremely smooth and efficient manner. Moreover, it is easy to deflect the bucket train laterally, as shown in FIG. 20.

The circular shape of the buckets 42 and the axial connection of the cables 44 to the buckets also contribute to the smoothness and efficiency with which the bucket train passes around the various wheels.

On each of the wheels 46–56, the cables 44 are supported by the grooved members 134, as shown in FIG. 6. The buckets 42 are supported by the inclined rollers 142, so that the axes of the buckets 42 are substantially tangent to the pitch circle defined by the grooves 136 in the grooved member 134. By virtue of the flaring or horn-shaped guide bores 104 in the end fittings or plugs 86 and 88, the cables 44 are supported along the pitch circle, rather than along chords of the pitch circle. Thus, the cables 44 are completely supported along the pitch circle, except for the short lengths between the grooved members 134 and the adjacent end fittings 86 and 88. The chordal action of these short portions is virtually negligible, so that the bucket train passes around the wheels 46–56 with the minimum of jerkiness. The rollers 142 act as seat members for the buckets 42, which effectively become part of the wheels in that the cables are supported and held along the pitch circle by the buckets. On the wheels 46, 48 and 56, the clusters of four diagonal rollers 152 guide the cables 144 onto the grooved members 134 and also engage the end fittings 86 and 88 to the extent necessary to synchronize the wheels with the bucket train. The rolling action of these rollers minimizes the friction between the wheels and the bucket train, so that the bucket train passes around the wheels in a smooth manner and with a minimum of wear.

On the driving wheel 50, the rollers 240 engage the bottom walls 68 of each bucket 42 in turn, so as to transmit the necessary driving force to the bucket train. The rolling action between the rollers and the buckets makes it possible for the driving wheel to operate in a smooth manner.

As illustrated in FIG. 15, each bucket 42 in turn carries the driving load. The arcuate spacing between the adjacent pairs of rollers 240 is slightly greater than the arcuate spacing between the buckets 42. Thus, there is clearance between the rollers 240 and the buckets behind the driven bucket, as indicated at 246 and 248 in FIG. 15. As each bucket 42 departs from the driving wheel 50, the bucket moves out of engagement with the corresponding rollers 240, whereupon the load shifts to the preceding bucket. The clearance which previously existed is taken up by a slight shifting movement of the driving wheel 50 relative to the bucket train 40. Such shifting movement occurs in a smooth manner because of the provision of the rollers 142 and 240.

The circular frusto-conical buckets 42 dig into the bulk material 36 in a highly efficient manner. Moreover, the circular shape of the buckets facilitates the passage of the buckets through the circular Butterworth openings 60 and 62.

Because of the provision of left- and right-hand threads on the fittings 86 and 88 for the cables 44, there is a turnbuckle action between the buckets 42 and the end fittings. Thus, each bucket 42 can be unscrewed from both end fittings by rotating the bucket in one direction while the end fittings are held stationary. This arrangement greatly facilitates the assembly and disassembly of the bucket train.

The flaring guide bores 104 in the end fittings 86 and 88 limit the flexure of the cables 44 so as to obviate failure of the cables due to fatigue. The curvature of the bores 104 corresponds to the curvature of the pitch circle along which the cables travel around the various wheels 46-56.

By virtue of the swaged sleeves 106 on the ends of the cables 44, the end fittings 86 and 88 are irremovably secured to the cables. This arrangement for anchoring the cables makes it possible to utilize the full strength of the cables. Thus, the load carrying capacity of the bucket train is increased.

Due to the smooth and efficient manner with which the bucket train passes around the various wheels 46-56, the unloading machine 30 can be operated at high speed without excessive vibration or other difficulties. Thus, the machine is able to dig and elevate the bulk material at an extremely high rate. The high capacity of the machine makes it possible to unload the ship in a short time and at a low cost.

Various other modifications, alternative constructions, and equivalents may be employed without departing from the true spirit and scope of the invention, as exemplified in the foregoing description and defined in the following claims.

I claim:

1. In a materials handling machine,
the combination comprising a plurality of buckets,
a plurality of flexible cables extending between said buckets and interconnecting said buckets to form a bucket train,
and a wheel for receiving and guiding said bucket train,
said wheel having a plurality of spaced cable-supporting members thereon for receiving and supporting said cables,
said wheel having a plurality of spaced bucket-supporting members thereon for engaging said buckets and holding said buckets outwardly to provide for smooth movement of said bucket train to and from said wheel,
said bucket-supporting members comprising rollers for engaging and guiding each bucket,
said buckets being generally circular in cross-section,
said rollers being arranged in angularly related pairs for guiding and engaging each buckets,
each pair of rollers forming a seat for retaining the corresponding bucket against lateral movement.

2. The combination of claim 1,
in which each pair of rollers is radially adjustable for adjusting the radial positions of the buckets.

3. In a materials handling machine,
the combination comprising a plurality of buckets,
a plurality of flexible cables extending between said buckets and interconnecting said buckets to form a bucket train,
and a wheel for receiving and guiding said bucket train,
said wheel having a plurality of spaced cable-supporting members thereon for receiving and supporting said cables,
said wheel having a plurality of spaced bucket-supporting members thereon for engaging said buckets and holding said buckets outwardly to provide for smooth movement of said bucket train to and from said wheel,
said wheel being provided with a plurality of guide rollers adjacent said spaced cable-supporting members for guiding said cables and synchronizing said bucket train with said wheel.

4. The combination of claim 3,
in which said guide rollers are arranged in clusters of four rollers disposed around said spaced members and angularly related to said cables.

5. The combination of claim 4,
in which each of said guide rollers is formed with a pair of frusto-conical peripheral surfaces which provide a generally V-shaped ridge on each roller,
said frusto-conical surfaces being engageable with said cables and said buckets.

6. In a materials handling machine,
the combination comprising a plurality of buckets,
a plurality of flexible cables extending between said buckets and interconnecting said buckets to form a bucket train,
and a wheel for receiving and guiding said bucket train,
said wheel having a plurality of spaced cable-supporting members thereon for receiving and supporting said cables,
said wheel having a plurality of spaced bucket-supporting members thereon for engaging said buckets and holding said buckets outwardly to provide for smooth movement of said bucket train to and from said wheel,
and a plurality of drive rollers on said wheel for engaging the ends of said buckets to drive said bucket train,
said drive rollers being arranged in pairs for engaging each bucket on opposite sides of the corresponding cable.

7. In a materials handling machine,
the combination comprising a plurality of buckets,
a plurality of flexible cables extending between said buckets and interconnecting said buckets to form a bucket train,
and a wheel for receiving and guiding said bucket train,
said wheel having a plurality of spaced cable-supporting members thereon for receiving and supporting said cables,
said wheel having a plurality of spaced bucket-supporting members thereon for engaging said buckets and holding said buckets outwardly to provide for smooth movement of said bucket train to and from said wheel, and a plurality of drive rollers on said wheel for engaging the ends of said buckets to drive said bucket train, the peripheral spacing of said drive rollers on said wheel being slightly greater than the peripheral spacing of said buckets so that only one bucket is driven at any one time.

8. In a materials handling machine,
the combination comprising a plurality of buckets,
a plurality of flexible cables interconnecting said buckets to form a bucket train,
and a wheel for receiving and guiding said bucket train,
said wheel having a plurality of spaced members thereon for receiving and supporting the successive cables,
and a plurality of rollers on said wheel for engaging the successive buckets to drive the bucket train,
said rollers being arranged in pairs for engaging each bucket on opposite sides of the corresponding cable.

9. In a materials handling machine,
the combination comprising a plurality of buckets,
a plurality of flexible cables interconnecting said buckets to form a bucket train,
and a wheel for receiving and guiding said bucket train,
said wheel having a plurality of spaced members thereon for receiving and supporting the successive cables,
and a plurality of rollers on said wheel for engaging the successive buckets to drive the bucket train,
the peripheral spacing between said rollers being slightly greater than the peripheral spacing between said buckets so that only one bucket is driven at any one time.

10. A materials handling machine,
comprising the combination of a flexible endless bucket train,
at least two supporting wheels for supporting said bucket train,
said supporting wheels being generally in the same vertical plane but being spaced apart generally horizontally therein,
said bucket train having a lower portion tending to hang freely along a catenary curve generally in said vertical plane between said wheels,
an additional wheel engaging said lower portion of said bucket train and displacing said lower portion laterally out of said vertical plane,
means for driving at least one of the supporting wheels to circulate said bucket train whereby said bucket train will travel downwardly from one of said supporting wheels and upwardly to the other supporting wheel,
said additional wheel engaging said bucket train along the downward flight thereof,
a second additional wheel engaging said bucket train along the upward flight thereof for guiding the bucket train upwardly to the corresponding supporting wheel,
and a swivel mount rotatable about a generally vertical axis for supporting said second additional wheel.

11. In a cargo ship,
the combination comprising a deck having two small openings therein,
an endless bucket train extending through said openings,
at least two supporting wheels for supporting and driving said bucket train,
means mounting said wheels on the upper side of said deck adjacent said openings for rotation about generally horizontal axes to circulate the bucket train upwardly and downwardly through said openings,
an additional wheel for engaging and guiding the bucket train through one of said openings,
and a swivel mount supporting said additional wheel below said deck for rotation about a generally horizontal axis and for swiveling movement about the axis of the corresponding opening in the deck.

12. A combination according to claim 11,
in which said swivel mount extends through the corresponding opening in said deck.

13. A combination according to claim 11,
in which said swivel mount extends through the corresponding opening in said deck,
said swivel mount being of a size smaller than said opening to provide for quick insertion and removal of said swivel mount through said opening.

14. A combination according to claim 11,
in which said additional wheel comprises a hub having a plurality of sockets therein,
a plurality of arms removably received in said sockets,
and a plurality of braces disengageably connected between said arms to provide for quick assembly and disassembly of said additional wheel.

15. A combination according to claim 11,
in which each of said braces comprises a toggle latch for opening and closing said brace.

16. A materials handling machine,
comprising the combination of a flexible endless bucket train including a plurality of buckets which are substantially circular in cross-section,
said bucket train including a plurality of flexible cables extending axially between said buckets,
at least two supporting wheels for supporting said bucket train,
said supporting wheels being generally in the same vertical plane but being spaced apart generally horizontally therein,
said bucket train having a lower portion tending to hang freely along a catenary curve generally in said vertical plane between said wheels,
an additional wheel engaging said lower portion of said bucket train and deflecting said lower portion laterally out of said vertical plane,
said bucket train extending part way around said additional wheel,
and means supporting said additional wheel with said additional wheel in a plane different from said vertical plane.

17. A machine according to claim 16,
comprising means for driving at least one of the supporting wheels to circulate said bucket train whereby said bucket train will travel downwardly from one of said supporting wheels and upwardly to the other supporting wheel,
said additional wheel engaging said bucket train along the downward flight thereof.

18. A machine according to claim 17,
comprising a second additional wheel engaging said lower portion of said bucket train along the upward flight thereof for guiding the bucket train upwardly to the corresponding supporting wheel.

19. A machine according to claim 16,
in which said last mentioned means include a member for rotatably supporting said additional wheel,
and a tethering element connected to and supporting said member.

20. In a materials handling machine,
the combination comprising a plurality of buckets which are generally circular in cross section,
a plurality of flexible cables extending generally axially between said buckets and interconnecting said buckets to form a bucket train,
each cable forming the sole connection between adjacent buckets,
and a wheel for receiving and guiding said bucket train,
said wheel having a closed generally cylindrical inner wall and a pair of closed side walls extending outwardly therefrom for confining any material which may be dumped from said buckets, said wheel having a plurality of spaced cable supporting members disposed between said side walls and projecting outwardly relative to said inner wall for receiving and supporting said cables, said cable suporting members being arcuate and extending along a pitch circle, said wheel having a plurality of spaced bucket supporting members disposed between said side walls and projecting outwardly relative to said inner wall for engaging said buckets and holding said buckets outwardly with their axes tangential to said pitch circle to provide for smooth movement of said bucket train to and from said wheel, said cable supporting members projecting outwardly from said inner wall to a greater extent than said bucket supporting members.

21. In a materials handling machine, the combination comprising a plurality of buckets which are generally circular in cross-section, a plurality of flexible cables extending generally axially between said buckets and interconnecting said buckets to form a bucket train, and a wheel for receiving and guiding said bucket train, said wheel having a plurality of spaced cable-supporting members thereon for receiving and supporting said cables, said wheel having a plurality of spaced bucket-supporting roller elements thereon for engaging said buckets and holding said buckets outwardly to provide for smooth movement of said bucket train to and from said wheel, said roller elements being arranged in angularly related pairs for guiding and engaging each bucket, each pair of roller elements forming a seat for retaining the corresponding bucket against lateral movement.

22. In a materials handling machine, the combination comprising a plurality of buckets, a plurality of flexible cables extending between said buckets and interconnecting said buckets to form a bucket train, and a wheel for receiving and guiding said bucket train, said wheel having a plurality of spaced cable-supporting members thereon for receiving and supporting said cables, said wheel having a plurality of spaced bucket-supporting members thereon for engaging said buckets and holding said buckets outwardly to provide for smooth movement of said bucket train to and from said wheel, said wheel being provided with a plurality of guide roller elements adjacent said spaced cable-supporting members for synchronizing said bucket train with said wheel.

23. The combination of claim 22, in which said guide roller elements are arranged in clusters of four roller elements disposed around said spaced cable-supporting members and angularly related to said cables.

24. In a materials handling machine, the combination comprising a plurality of buckets, a plurality of flexible cables extending between said buckets and interconnecting said buckets to form a bucket train, and a wheel for receiving and guiding said bucket train, said wheel having a plurality of spaced cable-supporting members thereon for receiving and supporting said cables, said wheel having a plurality of spaced bucket-supporting members thereon for engaging said buckets and holding said buckets outwardly to provide for smooth movement of said bucket train to and from said wheel, and a plurality of drive roller elements of said wheel for engaging the ends of said buckets to drive said bucket train, said drive roller elements being arranged in pairs for engaging each bucket on opposite sides of the correspoding cable.

25. In a materials handling machine, the combination comprising a plurality of buckets, a plurality of flexible cables extending between said buckets and interconnecting said buckets to form a bucket train, and a wheel for receiving and guiding said bucket train, said wheel having a plurality of spaced cable-supporting members thereon for receiving and supporting said cables, said wheel having a plurality of spaced bucket-supporting members thereon for engaging said buckets and holding said buckets outwardly to provide for smooth movement of said bucket train to and from said wheel, and a plurality of drive roller elements of said wheel for engaging the ends of said buckets to drive said bucket train, the peripheral spacing of said drive roller elements on said wheel being slightly greater than the peripheral spacing of said buckets so that only one bucket is driven at any one time.

26. In a materials handling machine, the combination comprising a plurality of buckets, a plurality of flexible cables interconnecting said buckets to form a bucket train, and a wheel for receiving and guiding said bucket train, said wheel having a plurality of spaced members thereon for receiving and supporting the successive cables, and a plurality of roller elements on said wheel for engaging the successive buckets to synchronize the wheel and the bucket train, said roller elements being arranged in pairs for engaging each bucket on opposite sides of the corresponding cable.

27. In a materials handling machine.

the combination comprising a plurality of buckets, a plurality of flexible cables interconnecting said buckets to form a bucket train, and a wheel for receiving and guiding said bucket train, said wheel having a plurality of spaced members thereon for receiving and supporting the successive cables, and a plurality of roller elements on said wheel for engaging the successive buckets to synchronize the wheel and the bucket train, the peripheral spacing between said roller elements being slightly greater than the peripheral spacing between said buckets so that only one bucket is engaged by said roller elements at any one time.

References Cited

UNITED STATES PATENTS

| | | | |
|---|---|---|---|
| 19,930 | 4/1858 | Johnson | 37—69 |
| 262,376 | 8/1882 | Crehore | 198—140 |
| 392,421 | 11/1888 | Garland | 198—151 |
| 651,931 | 6/1900 | Peck | 214—13 |
| 735,380 | 8/1903 | Hoover et al. | 214—15 X |
| 757,858 | 4/1904 | Andrews | 214—15 X |
| 807,363 | 12/1905 | Dodge | 74—243 |
| 1,124,197 | 11/1915 | Bell | 198—140 X |
| 1,956,312 | 4/1934 | Browning | 198—151 |
| 2,204,236 | 6/1940 | Shonnard | 198—151 |
| 3,002,634 | 10/1961 | Culp et al. | 214—15 |
| 3,311,222 | 3/1967 | Crawford et al. | 198—196 |

EVON C. BLUNK, *Primary Examiner.*

M. L. AJEMAN, *Assistant Examiner.*